(12) United States Patent
Dai et al.

(10) Patent No.: US 9,220,125 B2
(45) Date of Patent: Dec. 22, 2015

(54) METHOD FOR PROCESSING HEARTBEAT MESSAGE, METHOD FOR ACQUIRING HEARTBEAT PERIOD, AND ACCESS NETWORK DEVICE

(71) Applicant: Huawei Technologies Co., Ltd., Shenzhen, Guangdong (CN)

(72) Inventors: Mingzeng Dai, Shenzhen (CN); Pingping Xing, Shenzhen (CN); Qufang Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 198 days.

(21) Appl. No.: 14/016,824

(22) Filed: Sep. 3, 2013

(65) Prior Publication Data

US 2014/0003352 A1  Jan. 2, 2014

Related U.S. Application Data

(63) Continuation of application No. PCT/CN2012/071424, filed on Feb. 22, 2012.

(30) Foreign Application Priority Data

Mar. 8, 2011  (CN) .......................... 2011 1 0054596

(51) Int. Cl.
*H04W 76/04* (2009.01)
*H04L 12/26* (2006.01)
(Continued)

(52) U.S. Cl.
CPC ......... *H04W 76/045* (2013.01); *H04L 41/0836* (2013.01); *H04L 43/10* (2013.01); *H04L 43/103* (2013.01); *H04L 47/10* (2013.01); *H04L 43/0817* (2013.01); *H04L 43/16* (2013.01)

(58) Field of Classification Search
None
See application file for complete search history.

(56) References Cited

U.S. PATENT DOCUMENTS

| 5,832,195 | A * | 11/1998 | Braun et al. ...................... 714/2 |
| 7,353,259 | B1 * | 4/2008 | Bakke ................. G06F 9/44505 709/208 |
| 8,717,974 | B2 * | 5/2014 | Rofougaran .................. 370/328 |

(Continued)

FOREIGN PATENT DOCUMENTS

| CN | 1870646 A | 11/2006 |
| CN | 101043388 A | 9/2007 |

(Continued)

OTHER PUBLICATIONS

Aboba, "AAA Transport Profile," Internet-Draft, <draft-ieft-aaa-transport-02.txt>, AAA Working Group, The Internet Society (May 18, 2001).

*Primary Examiner* — Brandon Renner
*Assistant Examiner* — Deepa Belur
(74) *Attorney, Agent, or Firm* — Leydig, Voit & Mayer, Ltd.

(57) ABSTRACT

The present invention provides a method for processing a heartbeat message, a method for acquiring a heartbeat period, and an access network device. The method for processing a heartbeat message includes: acquiring, by a terminal, heartbeat control information (101); and sending, by the terminal, a heartbeat message according to the heartbeat control information (102). Embodiments of the present invention can reduce the signaling processing burden on a network side device and reduce the power consumption of a terminal, thereby ensuring the normal operation of the communication service of the terminal.

6 Claims, 3 Drawing Sheets

(51) Int. Cl.
*H04L 12/24* (2006.01)
*H04L 12/801* (2013.01)

(56) References Cited

U.S. PATENT DOCUMENTS

| | | | |
|---|---|---|---|
| 8,724,486 B2* | 5/2014 | Seto | H04W 76/045 370/252 |
| 8,804,486 B2* | 8/2014 | Chen | H04L 45/00 370/217 |
| 2002/0152446 A1* | 10/2002 | Fleming | G06F 11/0715 714/815 |
| 2006/0020707 A1* | 1/2006 | Undery | H04L 29/06 709/230 |
| 2006/0179147 A1* | 8/2006 | Tran | G06F 11/2012 709/227 |
| 2008/0082142 A1 | 4/2008 | Clark et al. | |
| 2010/0008946 A1 | 1/2010 | Szalay et al. | |
| 2010/0054135 A1* | 3/2010 | Rahman et al. | 370/242 |
| 2010/0281102 A1* | 11/2010 | Chinta et al. | 709/203 |
| 2011/0296011 A1* | 12/2011 | Dare et al. | 709/224 |
| 2012/0188928 A1* | 7/2012 | Wang et al. | 370/311 |
| 2012/0294177 A1 | 11/2012 | Yan et al. | |
| 2013/0124752 A1* | 5/2013 | Griffith | G06F 11/3093 709/235 |

FOREIGN PATENT DOCUMENTS

| | | |
|---|---|---|
| CN | 101217482 A | 7/2008 |
| CN | 101518030 A | 8/2009 |
| CN | 101557405 A | 10/2009 |
| CN | 101778019 A | 7/2010 |
| CN | 101808044 A | 8/2010 |
| EP | 2088714 A1 | 8/2009 |
| WO | WO 2009000316 A1 | 12/2008 |

* cited by examiner

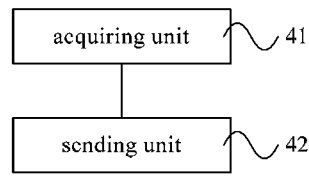
FIG. 4
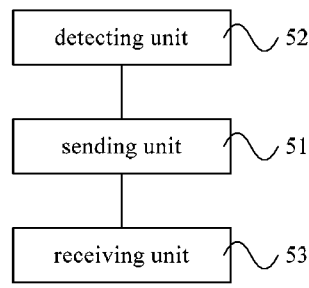
FIG. 5
| The access network device acquires a heart beat period of the terminal | ~601 |
FIG. 6

METHOD FOR PROCESSING HEARTBEAT MESSAGE, METHOD FOR ACQUIRING HEARTBEAT PERIOD, AND ACCESS NETWORK DEVICE

CROSS REFERENCE TO RELATED APPLICATIONS

This application is a continuation of International Patent Application No. PCT/CN2012/071424, filed on Feb. 22, 2012, which claims priority to Chinese patent application No. 201110054596.X, filed on Mar. 8, 2011, both of which are incorporated herein by reference in their entireties.

TECHNICAL FIELD

Embodiments of the present invention relate to the field of communication technology and, in particular, to a method for processing a heartbeat message, a method for acquiring a heartbeat period, and an access network device.

BACKGROUND

With the development of the communication technology, more and more application programs have been integrated on a terminal, for example, instant messenger (Instant Messenger, IM) application programs, such as MSN, QQ. During operating, corresponding clients of the above IM application programs send heartbeat (Heart Beat, HB) messages to a server periodically, so as to notify the server of the online state of the clients via a network side device. In the prior art, the terminal sends the heartbeat message to the server at set sending time of its own via the network side device, which may affect the processing for normal communication messages of the network side device and may even affect the normal operating of communication services of the terminal.

A radio resource management (Radio Resource Management, RRM) algorithm involves in a time parameter for a state transition of a terminal (Terminal), and the terminal can make the state transition according to the time parameter, for example, an access network device can decide to release the terminal from a connected state to an idle state according to the setting of an inactivity timer (User Inactivity timer). Provided that the inactivity timer set by the access network device is T1, and the access network device starts the timer T1 to start the timing if no data is received from the terminal. If the access network device receives the data from the terminal during operating of the timer T1, the access network device stops the timing; and starts the timer T1 again when the terminal service is completed. If the timer T1 expires, the access network device initiates a context release procedure of the terminal to release the terminal from a connected state to an idle state. After the terminal enters the idle state, if the terminal needs to send a heartbeat message, the terminal needs to enter the connected state firstly, since the heartbeat message is sent periodically, it may cause frequently switching between the connected state and the idle state of the terminal, therefore, the signaling processing burden on the network side device and the power consumption of the terminal is increased, and even the normal operations of the communication service of the terminal are affected.

SUMMARY

Embodiments of the present invention provide a method for processing a heartbeat message, and an access network device, so as to guarantee the processing for a normal communication message of a network side device and thereby ensure the normal operation of the communication service of the terminal.

One aspect of the invention provides a method for processing a heartbeat message, including:
acquiring, by a terminal, heartbeat control information; and
sending, by the terminal, a heartbeat message according to the heartbeat control information.

Another aspect of the invention provides a terminal, including:
an acquiring unit, configured to acquire heartbeat control information; and
a sending unit, configured to send a heartbeat message according to the heartbeat control information.

Still another aspect of the invention provides an access network device, comprising:
a sending unit, configured to send heartbeat control information to a terminal, so that the terminal sends a heartbeat message according to the heartbeat control information.

Embodiments of the present invention provide a method for acquiring a heartbeat period, and an access network device, which can reduce the signaling processing burden on a network side device and reduce the power consumption of a terminal, thereby ensuring the normal operation of the communication service of the terminal.

One aspect of the invention provides a method for acquiring a heartbeat period, including:
acquiring, by an access network device, a heartbeat period of a terminal, where the acquiring, by the access network device, the heartbeat period of the terminal includes:
acquiring, by the access network device, a heartbeat period reported by the terminal; or
detecting, by the access network device, received heartbeat messages sent by the terminal, and acquiring the heartbeat period of the terminal; or
acquiring, by the access network device, a heartbeat period sent by a core network device, wherein the heartbeat period is acquired by the core network device by detecting the received heartbeat message sent by the terminal.

Still another aspect of the invention provides an access network device, including:
an acquiring unit, configured to acquire a heartbeat period of a terminal, where acquiring, by the access network, the heartbeat period of the terminal includes:
acquiring, by the access network device, a heartbeat period reported by the terminal; or
detecting, by the access network device, received heartbeat messages sent by the terminal, and acquiring the heartbeat period of the terminal; or
acquiring, by the access network device, a heartbeat period sent by a core network device, wherein the heartbeat period is acquired by the core network device by detecting the received heartbeat messages sent by the terminal.

Applying the technical solutions provided by embodiments of the present invention can guarantee the normal operation of the communication service of the terminal.

BRIEF DESCRIPTION OF THE DRAWINGS

In order to describe embodiments of the present invention or the technical solutions in the prior art more clearly, the accompanying drawings used in the description of embodiments of the present invention or the prior art are briefly described below. Apparently, the accompanying drawings illustrate only some embodiments of the present invention, and persons skilled in the art can obtain other drawings according to these drawings without any creative efforts.

FIG. 4 is a schematic structural diagram of a terminal according to another embodiment of the present invention;

FIG. 5 is a schematic structural diagram of an access network device according to another embodiment of the present invention;

FIG. 6 is a schematic flow chart of a method for acquiring a heartbeat period according to another embodiment of the present invention;

DESCRIPTION OF EMBODIMENTS

In order to make the objects, technical solutions, and advantages of embodiments of the present invention more clearly, the technical solutions in embodiments of the present invention are hereinafter described clearly and completely with reference to the accompanying drawings in embodiments of the present invention. Obviously, the described embodiments are only a part of embodiments of the present invention, rather than all embodiments of the present invention. All the other embodiments obtained by persons skilled in the art based on embodiments of the present invention without any creative efforts shall fall within the protection scope of the present invention.

Figure 1:
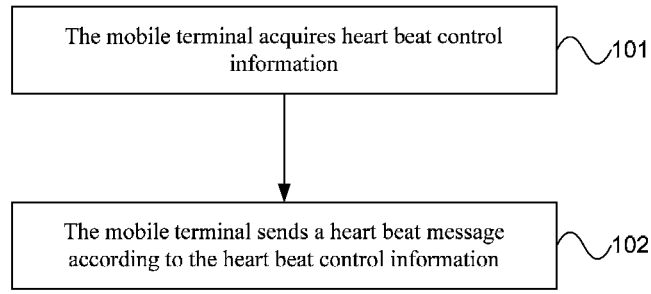
FIG. 1 is a schematic flow chart of a method for processing a heartbeat message according to an embodiment of the present invention.

FIG. 1 is a schematic flow chart of a method for processing a heartbeat message according to an embodiment of the present invention, as shown in FIG. 1, the method for processing the heartbeat message according to this embodiment may include the following steps:

Step 101: The terminal acquires heartbeat control information;

The above heartbeat control information may include, but is not limited to, one or more of the following: a timer, a heartbeat data amount threshold value, indication information for indicating a heartbeat period, and indication information for indicating a heartbeat period adjustment rule. For example, the terminal may receive the heartbeat control information sent to the terminal by the access network device. The heartbeat control information may be sent to the terminal by the access network device according to the equipment types of the terminal (such as an ordinary terminal or an intelligent terminal) and/or services types of the terminal. For example, the access network device can distinguish equipment types of the terminal according to terminal capability information reported by the terminal, such as an international mobile equipment identity (International Mobile Equipment Identity, IMEI), a subscriber profile ID (Subscriber Profile ID for RAT/Frequency Priority, SPID), and the access network device can distinguish service types of the terminal service according to a deep packet inspection (Deep Packet Inspection, DPI). The heartbeat control information sent by the access network device to terminals corresponding to different equipment types may be different, and the heartbeat control information sent by the access network device to terminals corresponding to different service types may also be different. Further, the access network device can trigger a sending procedure of the heartbeat control information actively, for example, the access network device can detect the load of the access network device, and trigger a procedure of sending the heartbeat control information to the terminal if determining that the load of the access network device is greater than a preset load threshold value; or the access network device can trigger the sending procedure of the heartbeat control information passively, for example, the access network device can also acquire an overload indication from the core network device, and trigger the procedure of sending the heartbeat control information to the terminal, where the overload indication is sent to the access network device by the core network when detecting that the load of the core network device is greater than a preset load threshold value, so as to indicate an overload of the core network device to the access network device.

In particular, the access network device may send the heartbeat control information to the terminal (such as an access layer of the terminal) via a message such as a system message, a RRC dedicated message and a MAC control element (MAC Control Elements) message.

Step 102: The terminal sends a heartbeat message according to the heartbeat control information.

For example, the terminal sends the heartbeat message to a server corresponding to the application program on the terminal, or sends the heartbeat message to the server corresponding to the application program on the terminal via a network side device (such as an access network device and/or a core network device) according to the heartbeat control information.

In this step, if the heartbeat control information is a timer, the terminal can start the timer after the heartbeat control information is received by the terminal, and send the heartbeat message to the server after the timer expires. Further, the terminal can re-start the timer after sending the heartbeat message. Optionally, the access layer of the terminal may acquire at least one heartbeat message sent by the application layer of the terminal during operating of the timer, where the application layer of the terminal may send the heartbeat messages to the access layer of the terminal frequently according to the technical solutions in the prior art. Further, the access layer of the terminal sends the at least one heartbeat message to the server after the timer expires. That is, the heartbeat message sent by the terminal after the timer expires in this step may be the at least one heartbeat message acquired from the application layer of the terminal by the access layer of the terminal before the timer expires. Optionally, the access layer of the terminal acquires the heartbeat message sent by the application layer of the terminal after the timer expires, and sends the heartbeat message to the server. That is, the heartbeat message sent by the terminal after the timer expires in this step may be the heartbeat message acquired from the application layer of the terminal by the access layer of the terminal after the timer expires. Optionally, the access layer of the terminal includes a radio resource control (Radio Resource Control, RRC) layer, a radio link control (Radio Link Control, RLC) layer, a medium access control (Media Access Control, MAC) layer and a physical layer.

In this step, if the heartbeat message is a heartbeat data amount threshold value, the access layer of the terminal acquires at least one heartbeat message sent by the application layer of the terminal, and sends the at least one heartbeat message to the server when the message amount of the at least one heartbeat message is greater than or equal to the heartbeat data amount threshold value.

It should be appreciated by persons skilled in the art that, if the executing entity of this step is the access layer of the terminal, the heartbeat control information in this embodiment may also include a timer and a heartbeat data amount threshold value, only if any one (the timer or the heartbeat data amount threshold value) satisfies the condition, the access layer of the terminal can send the heartbeat message received from the application layer of the terminal to the server.

In this step, if the heartbeat control information is indication information for indicating the heartbeat period, the terminal can send the heartbeat message to the server according to the heartbeat period. If the heartbeat control information is indication information for indicating a heartbeat period adjustment rule, the terminal can adjust the heartbeat period according to the heartbeat period adjustment rule, so as to obtain an adjusted heartbeat period, and then send the heartbeat message to a server according to the adjusted heartbeat period. In particular, the access layer of the terminal can acquire the heartbeat message sent by the application layer of the terminal according to the heartbeat period indicated by the indication information, or according to the adjusted heartbeat period obtained by adjusting the heartbeat period according to the heartbeat period adjustment rule indicated by the indication information, and send the heartbeat message to the server. Optionally, the heartbeat period adjustment rule may be that, the adjusted heartbeat period is multiples of the heartbeat period. For example, the terminal may adjust the heartbeat period according to the multiples directly; or the terminal may also adjust the heartbeat period according to the multiples based on whether there is traffic transmission in a period of time. Optionally, the heartbeat period adjustment rule may also be that the heartbeat period is adjusted by multiples, for example, the terminal may adjust the heartbeat period by multiples; or the terminal may adjusts the heartbeat period by multiples based on whether there is traffic transmission in a period of time.

It should be appreciated by persons skilled in the art that, if the executing entity of this step is the application layer of the terminal, the heartbeat control information in this embodiment may also include the indication information for indicating the heartbeat period, and the indication information for indicating the heartbeat period adjustment rule, only if any one (the indication information for indicating the heartbeat period, and the indication information for indicating the heartbeat period adjustment rule) satisfies the condition, the application layer of the terminal can send the heartbeat message to the server through the access layer of the terminal.

In this embodiment, the terminal acquires the heartbeat control information, determines the heartbeat period according to the heartbeat control information, and sends the heartbeat messages to the server according to the determined heartbeat period, rather than decides when to send the heartbeat message to the server by the terminal itself, such that the problem that the processing for a normal communication message of the network side device is affected by sending heartbeat messages by the terminal can be avoided, the processing for the normal communication message of the network side device is guaranteed and thereby the normal operation of the communication service of the terminal is ensured.

Further, if the heartbeat period indicated by the heartbeat control information in this embodiment is greater than the heartbeat period determined by the terminal itself (that is, the heartbeat period determined by the terminal by adopting the prior art), the terminal reduces the number of times of sending the heartbeat message, thus the signaling processing burden on a network side device and the power consumption of the terminal are further reduced, and the normal operation of the communication service of the terminal is further guaranteed.

It should be noted that, the heartbeat control information in this embodiment may be the heartbeat control information of all the services of the terminal, or can be the heartbeat control information of a certain one or more services of the terminal. It should be appreciated that, if it is the heartbeat control information of a certain one or more services of the terminal, the heartbeat control information further includes service identifiers of the one or several services, such that the terminal can identify corresponding services according to the service identifiers and, thus, can send the heartbeat messages of the identified services according to the heartbeat control information.

The method for processing the heartbeat message in this embodiment can be applied to various radio access networks, for example, networks such as an evolved universal mobile telecommunication system (Universal Mobile Telecommunication System, UMTS) territorial radio access network (Evolved Universal Mobile Telecommunication System Territorial Radio Access Network, E-UTRAN), a UMTS territorial radio access network (UMTS Territorial Radio Access Network, UTRAN), a global system for mobile communication (Global System for Mobile Communications, GSM) or an enhanced data rate for GSM Evolution technology (Enhanced Data rate for GSM Evolution, EDGE) radio access network (GSM EDGE Radio Access Network, GERAN).

Where, the access network device may be an evolved NodeB (Evolved NodeB, eNB), or a home evolved NodeB (Home Evolved NodeB, HeNB) in the E-UTRAN, may also be a radio network controller (Radio Network Controller, RNC) or a base station controller (Base Station Controller, BSC) in the UTRAN/GERAN, and may also be a network element such as an access network logical function of an ePDG in a WLAN which is a non-3GPP network, an access service network base station (Access Service Network Base Station, ASN BS) in a WiMAX network, an access network logical function of a HRPD AN in a CDMA network.

Figure 2:
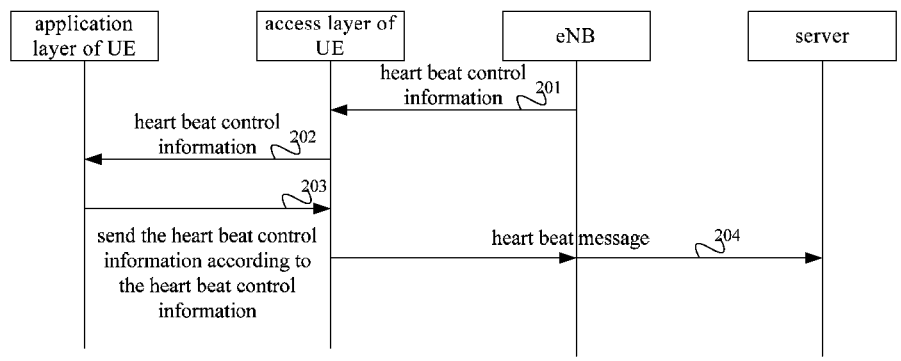
FIG. 2 is a schematic flow chart of a method for processing a heartbeat message according to another embodiment of the present invention.

Hereinafter, the technical solutions of embodiments of the present invention will be described in detail by taking the E-UTRAN as an example. FIG. 2 is a schematic flow chart of a method for processing a heartbeat message according to another embodiment of the present invention, as shown in FIG. 2, the method for processing the heartbeat message according to this embodiment may include the following steps:

Step 201: The eNB sends the heartbeat control information to the access layer of the terminal, where the heartbeat control information may include a timer, indication information for indicating the heartbeat period, and an indication information for indicating the heartbeat period adjustment rule.

Optionally, the time length of the timer or the heartbeat period indicated by the indication information is greater than the heartbeat period determined by the terminal itself (or the current heartbeat period of the terminal).

In particular, the eNB may send the heartbeat control information to the access layer of the terminal via a message including but not limited to a system message, a RRC dedicated message or a MAC control element (MAC Control Elements) message.

In particular, the eNB can trigger the sending procedure of the heartbeat control information actively, for example, the eNB triggers sending the heartbeat control information to the access layer of the terminal when detecting that the eNB is overloaded. The eNB can also trigger the sending procedure of the heartbeat control information passively, for example, the eNB triggers sending the heartbeat control information to the access layer of the terminal when receiving an overload indication sent by other devices (such as a core network device). For example, if a mobility management entity (Mobility Management Entity, MME) detects that the MME is overloaded, the MME can send an overload indication to the eNB through a S1-AP message, and the eNB sends the heartbeat control information to the access layer of the terminal.

Step 202: The access layer of the terminal sends the heartbeat control information to the application layer of the terminal;

Step 203: The application layer of the terminal sends the heartbeat messages to the access layer of the terminal according to the heartbeat control information;

In this step, if the heartbeat control information is a timer, the application layer of the terminal starts the timer when receiving the timer, and the application layer of the terminal sends a heartbeat control information to a lower layer of the terminal after the timer expires, and re-starts the timer.

In this step, if the heartbeat control information is the indication information for indicating the heartbeat period adjustment rule, the application layer of the terminal can adjust the heartbeat period according to the heartbeat period adjustment rule indicated by the indication information, for example, provided that the current heartbeat period is n, and when the heartbeat period adjustment rule is that the heartbeat period is increased by one time in each adjustment, the application layer of the terminal can intercept whether there is traffic transmission in a period of time, and if no, adjust the heartbeat period to be 2n according to the adjustment rule indicated by the indication information, and then further intercept whether there is traffic transmission in the next period of time, and if still no, adjust the heartbeat period to be 3n;

If the heartbeat control information is the indication information for indicating the heartbeat period, the application layer of the terminal can adjust the heartbeat period according to the heartbeat period indicated by the adjusted heartbeat period, for example, provided that the current heartbeat period is n, when the adjusted heartbeat period indicates the heartbeat period is 2n, the application layer of the terminal can adjust the heartbeat period to be 2n; for another example, provided that the current heartbeat period is n, when the adjusted heartbeat period indicates the heartbeat period is m, the application layer of the terminal can adjust the heartbeat period to be m.

The application layer of the terminal, after adjusting the heartbeat period, can send the heartbeat messages to the access layer of the terminal according to the adjusted heartbeat period.

Step 204, The access layer of the terminal sends the heartbeat message to the server via the eNB.

In particular, in this step, the access layer of the terminal may determine whether the access layer of the terminal can send the heartbeat message to the server via the eNB directly, if yes, the access layer of the terminal sends the heartbeat message to the server via the eNB directly; if no, the access layer of the terminal firstly initiates a random access procedure to the eNB and then sends the heartbeat message to the server via eNB. If the random access procedure fails, the terminal may re-initiate the random access procedure, and send the heartbeat message to the server via the eNB after the random access procedure succeeds.

In this embodiment, the application layer of the terminal acquires the heartbeat control information, determines the heartbeat period according to the acquired heartbeat control information, and sends the heartbeat message to the server through the access layer of the terminal according to the heartbeat period, rather than decides when to send the heartbeat message to the server through the access layer of the terminal by the application layer of the terminal itself, thus the processing for the normal communication message of the network side device is guaranteed and thereby the normal operation of the communication service of the terminal is ensured. When the heartbeat period indicated by the heartbeat control information is greater than the heartbeat period determined by the terminal itself (that is, the heartbeat period determined by the terminal by adopting the prior art), the signaling processing burden on the network side device and the power consumption of the terminal can be further reduced.

Figure 3:
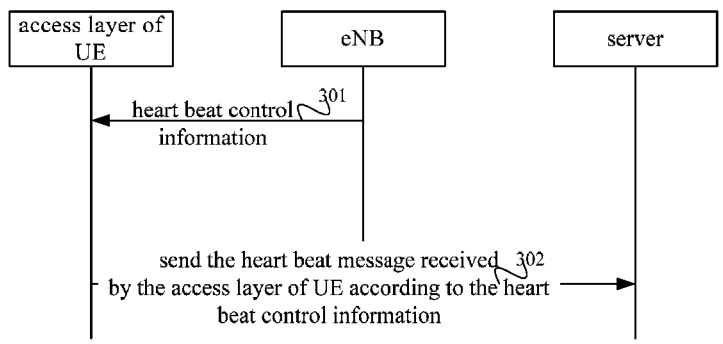
FIG. 3 is a schematic flow chart of a method for processing a heartbeat message according to another embodiment of the present invention.

FIG. 3 is a schematic flow chart of a method for processing a heartbeat message according to another embodiment of the present invention, as shown in FIG. 3, the method for processing the heartbeat message according to this embodiment may include the following steps:

Step 301, The eNB sends the heartbeat control information to the access layer of the terminal, where the heartbeat control information may include a timer or a heartbeat data amount threshold value.

Optionally, the time length of the timer is greater than the heartbeat period determined by the terminal itself (or the current heartbeat period of the terminal). Optionally, the heartbeat data amount threshold value is greater than the data amount of one heartbeat message.

In particular, the eNB may send the heartbeat control information to the access layer of the terminal via a message including but not limited to a system message, a RRC dedicated message or a MAC control element (MAC Control Elements) message.

In particular, the eNB can trigger the sending procedure of the heartbeat control information actively, for example, the eNB triggers sending the heartbeat control information to the access layer of the terminal when detecting that the eNB is overloaded. The eNB can also trigger the sending procedure of the heartbeat control information passively, for example, the eNB triggers sending the heartbeat control information to the access layer of the terminal when receiving an overload indication sent by other devices (such as a core network device). For example, if a mobility management entity (Mobility Management Entity, MME) detects that the MME is overloaded, the MME can send an overload indication to the eNB through a S1-AP message, and the eNB sends the heartbeat control information to the access layer of the terminal after receiving the overload indication.

Step 302, The access layer of the terminal sends the heartbeat message, which is from the application layer of the terminal and received by the access layer of the terminal, to the server via the eNB according to the heartbeat control information.

In this step, if the heartbeat control information is a timer, after the access layer of the terminal receives the timer, the access layer of the terminal may start the timer immediately, or start the timer when receiving the heartbeat message sent by the application layer of the terminal. The access layer of the terminal acquires a plurality of heartbeat messages sent by the application layer of the terminal according to the heartbeat period, for example, the access layer of the terminal can detect the heartbeat messages by means of the DPI or other prior arts, and cache the heartbeat messages. After the timer expires, the access layer of the terminal bundles the plurality of heartbeat messages cached by the access layer (such as the MAC layer) of the terminal, sends the bundled heartbeat message or one or more heartbeat messages received recently to the server via the eNB, and re-start the timer.

In this step, if the heartbeat control information is a heartbeat data amount threshold value, the access layer of the terminal acquires a plurality of heartbeat messages sent by the application layer of the terminal, and caches the plurality of heartbeat messages. When the message amount of the plurality of the heartbeat messages is greater than or equal to the heartbeat data amount threshold value, the access layer of the terminal bundles the plurality of heartbeat messages cached by the access layer (such as the MAC layer) of the terminal, sends the bundled heartbeat message or at least one heartbeat messages received recently to the server via the eNB. Where, the message amount may be the number of messages, and may also be the size of the messages, which is not limited in the present invention; correspondingly, the heartbeat data amount threshold value may be the number of messages or the size of messages, which is not limited in the present invention.

In particular, in this step, the access layer of the terminal may determine whether the access layer of the terminal can send the heartbeat message to the server via the eNB directly, if yes, the access layer of the terminal sends the heartbeat message to the server via the eNB directly; if no, the access layer of the terminal firstly initiates a random access procedure to the eNB and then sends the heartbeat message to the server via the eNB after the random access succeeds.

In this embodiment, the access layer of the terminal acquires the heartbeat control information, determines the heartbeat period according to the acquired heartbeat control information, and sends the heartbeat message received from the application layer of the terminal to the server according to the heartbeat period, rather than sends the heartbeat message to the server immediately after receiving the heartbeat message from the application layer of the terminal, where when to sent the heartbeat message to the access layer of the terminal is determined by the application layer of the terminal itself, thus the signaling processing burden on a network side device and the power consumption of the terminal are reduced, and the normal operation of the communication service of the terminal is guaranteed. When the heartbeat period indicated by the heartbeat control information is greater than the heartbeat period determined by the terminal itself (that is, the heartbeat period determined by the terminal by adopting the prior art), the signaling processing burden on the network side device and the power consumption of the terminal can be further reduced.

FIG. 4 is a schematic structural diagram of a terminal according to another embodiment of the present invention, as shown in FIG. 4, the terminal according to this embodiment may include an acquiring unit 41 and a sending unit 42. Where, the acquiring unit 41 is configured to acquire heartbeat control information; the sending unit 42 is configured to send a heartbeat message according to the heartbeat control information acquired by the acquiring unit 41. The heartbeat control information acquired by the acquiring unit 41 may include, but is not limited to, one or more of a timer, a heartbeat data amount threshold value, indication information for indicating the heartbeat period, and indication information for indicating a heartbeat period adjustment rule.

All the functions of the terminal in the embodiments corresponding to FIG. 1, FIG. 2 and FIG. 3 can be implemented by the terminal provided by embodiments of the present invention.

In particular, the heartbeat control information acquired by the acquiring unit 41 is a timer, and the sending unit 42 may be particularly configured to send the heartbeat message when the timer expires.

In particular, the heartbeat control information acquired by the acquiring unit 41 may be a heartbeat data amount threshold value, and the sending unit 42 may be particularly configured to send at least one heartbeat message when the message amount of the at least one heartbeat message is greater than or equal to the heartbeat data amount threshold value.

In particular, the heartbeat control information acquired by the acquiring unit 41 may be indication information for indicating the heartbeat period, and the sending unit 42 may be particularly configured to send the heartbeat message according to the heartbeat period indicated by the indication information; the heartbeat control information acquired by the acquiring unit 41 may be indication information for indicating a heartbeat period adjustment rule, and the sending unit 42 may be particularly configured to adjust the heartbeat period according to the heartbeat period adjustment rule indicated by the indication information to obtain an adjusted heartbeat period, and send the heartbeat message according to the adjusted heartbeat period.

In this embodiment, the terminal acquires the heartbeat control information through the acquiring unit, so that the sending unit can determine the heartbeat period according to the heartbeat control information acquired by the acquiring unit, and send the heartbeat message to the server according to the determined heartbeat period, rather than decides when to send the heartbeat message to the server by the terminal itself, such that the problem that the processing for normal communication message of the network side device is affected by sending heartbeat messages by the terminal can be avoided, the processing for the normal communication message of the network side device is guaranteed and thereby the normal operation of the communication service of the terminal is ensured.

Further, if the heartbeat period indicated by the heartbeat control information in this embodiment is greater than the heartbeat period determined by the terminal itself (that is, the heartbeat period determined by the terminal by adopting the prior art), the terminal reduces the number of times of sending the heartbeat message, thus the signaling processing burden on a network side device and the power consumption of the terminal are further reduced, and the normal operation of the communication service of the terminal is further guaranteed.

FIG. 5 is a schematic structural diagram of an access network device according to another embodiment of the present invention, as shown in FIG. 5, the access network device in this embodiment may include a sending unit 51, which is configured to send heartbeat control information to the terminal, so that the terminal sends a heartbeat message according to the heartbeat control information.

All the functions of the access network device in the embodiments corresponding to FIG. 1, FIG. 2 and FIG. 3 can be implemented by the access network device provided by embodiments of the present invention.

Optionally, the access network device in this embodiment may further include a detecting unit 51 configured to detect a load of the access network device; correspondingly, the sending unit 51 may be particularly configured to send the heartbeat control information to the terminal, if the load of the access network device detected by the detecting unit 52 is greater than a preset load threshold value.

Optionally, the access network device in this embodiment may further includes a receiving unit 53 configured to acquire an overload indication of a core network device, so that the sending unit 51 sends the heartbeat message to the terminal. The overload indication is sent to the access network device by the core network device when detecting that the load of the core network device is greater than a preset load threshold value.

In this embodiment, the access network device sends the heartbeat control information to the terminal through the sending unit, so that the terminal can send the heartbeat message to the server according to the heartbeat control information, rather than decide when to send the heartbeat message to the server by the terminal itself, such that the problem that the processing for a normal communication message of the network side device is affected by sending heartbeat messages by the terminal can be avoided, the processing for the normal communication message of the network side device is guaranteed and thereby the normal operation of the communication service of the terminal is ensured.

Further, if the heartbeat period indicated by the heartbeat control information in this embodiment is greater than the heartbeat period determined by the terminal itself (that is, the heartbeat period determined by the terminal by adopting the prior art), the terminal reduces the number of times of sending the heartbeat message, thus the signaling processing burden on a network side device and the power consumption of the terminal are further reduced, and the normal operation of the communication service of the terminal is further guaranteed.

FIG. 6 is a schematic flow chart of a method for acquiring a heartbeat period according to another embodiment of the present invention, as shown in FIG. 6, the method for acquiring the heartbeat period in this embodiment may include the following steps:

Step 601: The access network device acquires a heartbeat period of the terminal;

In particular, the access network device may acquire the heartbeat period of the terminal in a manner including but not limited to manners as followed:

A, The access network device acquires a heartbeat period reported by the terminal;

In particular, the access network device may send a heartbeat period request message to the access layer of the terminal, where the heartbeat period request message includes a bearer identifier and/or a service identifier. The heartbeat period request message may be a message including but not limited to a system message, a RRC dedicated message (such as a terminal capability query message, namely a UE Capability Inquire message), or a new RRC message. The access layer of the terminal inquires a heartbeat period of a certain service from the application layer of the terminal after receiving the heartbeat period request message. After acquiring the heartbeat period, the access layer of the terminal reports the acquired heartbeat period to the access network device, and the heartbeat period may be reported to the access network device via a message including but not limited to a RRC dedicated message (such as a terminal capability information (UE Capability Information) message) or a new RRC message.

Further, the access network device may trigger an acquiring procedure of the heartbeat period actively, for example, the access network device may detect the load of the access network device, and trigger requesting to acquire the heartbeat period to the terminal actively if the load of the access network device is greater than a preset load threshold value; or the access network device may also trigger the acquiring procedure of the heartbeat period passively, for example, the access network device may also acquire an overload indication from the core network device, and trigger the procedure of requesting to acquire the heartbeat period to the terminal, where the overload indication is sent to the access network device when the load of the core network device detected by the core network device is greater than a preset load threshold value, so as to indicate an overload of the core network device to the access network device.

B, The access network device acquires the heartbeat period of the terminal by detecting the received heartbeat message sent by the terminal;

In particular, the access network device may detect the heartbeat message by means of techniques, such as DPI, start the timer when detecting a heartbeat message of a certain service sent by the terminal for the first time, and stop the timer when detecting the heartbeat message of the service sent by the terminal for the second time, where the time on the timer is the heartbeat period.

Further, the access network device may detect the load of the access network device, and trigger requesting to detect the heartbeat message to acquire the heartbeat period actively if the load of the access network device is greater than a preset load threshold value; or the access network device may also acquire an overload indication from the core network device, and trigger the requesting to detect the heartbeat message to acquire the heartbeat period passively, where the overload indication is sent by the core network device when the load of the core network device detected by the core network device is greater than a preset load threshold value.

C, The access network device acquires a heartbeat period sent by a core network device, where the heartbeat period is acquired by the core network device by detecting the received heartbeat message sent by the terminal.

In particular, the core network device (for example, a packet data network gateway (Packet Data Network Gateway, P-GW for short)) may notify the access network device whether the DPI capability is supported by the core network device via a S1-AP message, for example, an initial terminal context request (Initial UE Context Request) message. If the core network device supports the DPI capability, for example, upon receiving an indication for indicating the DPI capability is supported from the core network device, the access network device may send a heartbeat period request message to the core network device, where the heartbeat period request message includes a bearer identifier and/or a service identifier. After receiving the heartbeat period request message, the core network device may detect the heartbeat message of the service indicated by the bearer identifier and/or the service identifier by means of techniques, such as DPI, start the timer when detecting a heartbeat message of the service sent by the terminal for the first time, stop the timer when detecting the heartbeat message of the service sent by the terminal for the second time, where the time on the timer is the heartbeat period. The core network device sends the heartbeat period to the access network device after detecting the heartbeat period.

Further, the access network device may detect the load of the access network device, and trigger requesting to acquire the heartbeat period to the core network device actively if the load of the access network device is greater than a preset load threshold value; or the access network device may also acquire an overload indication from the core network device, and trigger the requesting to acquire the heartbeat period to the core network device passively, where the overload indication is sent by the core network device when the load of the core network device detected by the core network device is greater than a preset load threshold value.

It should be noted that, the heartbeat period in this embodiment may be the heartbeat periods of all the services of the terminal (that is, the heartbeat periods of all the services are the same), or can be the heartbeat periods of certain one or more services of the terminal (that is, each service has a heartbeat period corresponding to the service itself). It should be appreciated that, if it is the heartbeat periods of certain one or more services of the terminal, the message carrying the heartbeat period may also include a service identifier of the service corresponding to the heartbeat period, so that the access network device can identify the service corresponding to the heartbeat period according to the service identifier and, thus, acquire the heartbeat periods of the certain one or more services of the terminal, and thereby determine the longest heartbeat period as the heartbeat period of the terminal.

Figure 9:
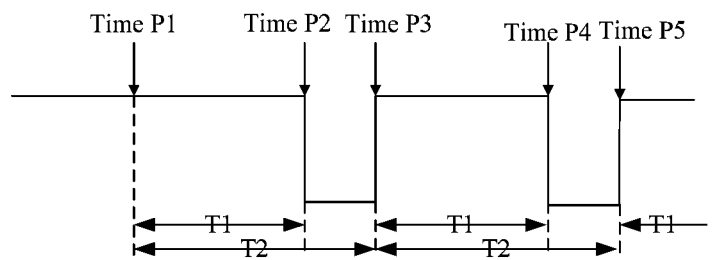
FIG. 9 is a schematic diagram of a setting of an inactivity timer in a method for acquiring a heartbeat period according to another embodiment of the present invention.

Further, after step 601, the access network device may set an inactivity timer according to the acquired heartbeat period. To make the method according to embodiments of the present invention clearer, the following will take setting the inactivity timer by the access network device as an example. As shown in FIG. 9, the inactivity timer is T1, the time length of the second timer T2 is the heartbeat period. Setting the time length of the inactivity timer by the access network device according to the heartbeat period may be that: set the time length of T1 to be a time length greater than the time length of T2. Optionally, at a certain time (such as the time P1 as shown in FIG. 9), both the T1 and the T2 are started. By setting the T1 as above, the problem that the terminal switches between the connected state and the idle state frequently which is caused by an improper setting of T1 can be avoided.

Time P1: the access network device starts the T1 when detecting that there is no data transmission at the terminal; and the terminal starts the T2 when detecting that there is no data to be sent and received.

Time P2: the T1 expires, and the access network device releases the terminal to the idle state;

Time P3: the T2 expires, and the terminal requests to enter the connected state so as to send a heartbeat message; after the heartbeat message is sent, the access network device re-starts the T1 when detecting that there is no data transmission at the terminal; and the terminal re-starts the T2 when detecting that there is no data to be sent and received;

Time P4: the T1 expires, and the access network device releases the terminal to the idle state;

Time P5: the T2 expires, and the terminal requests to enter the connected state so as to send a heartbeat message; after the heartbeat message is sent, the access network device re-starts the T1 when detecting that there is no data transmission at the terminal; and the terminal re-starts the T2 when detecting that there is no data to be sent and received.

In this embodiment, the access network device acquires the heartbeat period of the terminal, such that the access network device can set the time parameter in a RRM algorithm according to the acquired heartbeat period, thus the signaling processing burden on a network side device and the power consumption of the terminal are reduced, and the normal operation of the communication service of the terminal is guaranteed.

The method for acquiring the heartbeat period in this embodiment may be applied to various radio access networks, for example, networks such as an evolved universal mobile telecommunication system (Universal Mobile Telecommunication System, UMTS) territorial radio access network (Evolved Universal Mobile Telecommunication System Territorial Radio Access Network, E-UTRAN), a UMTS territorial radio access network (UMTS Territorial Radio Access Network, UTRAN), a global system for mobile communication (Global System for Mobile Communications, GSM)/an enhanced data rate for GSM Evolution technology (Enhanced Data rate for GSM Evolution, EDGE) radio access network (GSM EDGE Radio Access Network, GERAN).

Where, the access network device may be an evolved NodeB (Evolved NodeB, eNB), or a home evolved NodeB (Home Evolved NodeB, HeNB) in the E-UTRAN, may also be a radio network controller (Radio Network Controller, RNC), or a base station controller (Base Station Controller, BSC) in the UTRAN/GERAN, and may also be a network element such as an access network logical function of ePDG in a WLAN which is a non-3GPP network, an access service network base station (Access Service Network Base Station, ASN BS) in a WiMAX network, an access network logical function of a HRPD AN in a CDMA network.

Further, when the terminal switches to other access network devices, the access network device may further send the acquired heartbeat period to the other access network devices to which the terminal switches, so that the other access network devices can set the time parameter (such as the inactivity timer) of the state transition of the terminal in the RRM algorithm according to the heartbeat period. For example, taking an E-UTRAN X2 interface handover as an example, the eNB (source eNB) may carry the acquired heartbeat period in a handover request (HANDOVER REQUEST) message sent to other eNBs (target eNB) to which the terminal handovers. For another example, taking an E-UTRAN S1 interface handover as an example, the source eNB may carry the acquired heartbeat period in a handover request (Handover Required) message sent to the MME, and the MME carries the acquired heartbeat period in a handover request (HANDOVER REQUEST) message sent to a target eNB to which the terminal handovers.

Figure 7:
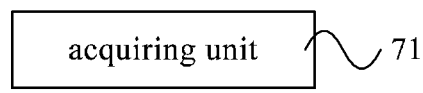
FIG. 7 is a schematic structural diagram of an access network device according to another embodiment of the present invention.

FIG. 7 is a schematic structural diagram of an access network device according to another embodiment of the present invention, as shown in FIG. 7, the access network device in this embodiment may include an acquiring unit 71. Where, the acquiring unit 71 is configured to acquire a heartbeat period of a terminal; where, acquiring, by the access network device, the heartbeat period of the terminal includes:

acquiring, by the access network device, a heartbeat period reported by the terminal; or detecting, by the access network device, received heartbeat messages sent by the terminal, and acquiring the heartbeat period of the terminal; or acquiring, by the access network device, a heartbeat period sent by a core network device, where the heartbeat period is acquired by the core network device by detecting the received heartbeat messages sent by the terminal.

All the functions of the access network device in the embodiment corresponding to FIG. 6 can be implemented by the access network device provided by embodiments of the present invention.

Figure 8:
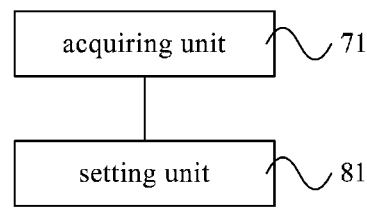
FIG. 8 is a schematic structural diagram of an access network device according to another embodiment of the present invention.

Further, as shown in FIG. 8, the access network device in this embodiment may further include a setting unit 81, which is configured to set an inactivity timer according to the heartbeat period.

In this embodiment, the access network device acquires the heartbeat period of the terminal through the acquiring unit, such that the setting unit can set the time parameter in a RRM algorithm according to the heartbeat period acquired by the acquiring unit, thus the signaling processing burden on a network side device and the power consumption of the terminal are reduced, and the normal operation of the communication service of the terminal is guaranteed.

It should be noted that, for simplicity of description, the above method embodiments are described as a series of operations, but it should be appreciated by persons skilled in the art that the present invention isn't restricted by the described operation sequence, since some steps may be implemented by other sequences or simultaneously according to the present invention. Also, it should be appreciated by persons skilled in the art that the embodiments described in the specification are preferred embodiments, and the associated operations and modules are not necessarily covered by the present invention.

In the foregoing embodiments, each embodiment emphasizes a specific aspect, and the part not detailed in one embodiment may be referred to relevant descriptions in another embodiment.

It should be appreciated by persons skilled in the art that, all or a part of the steps in the methods according to the embodiments described above may be implemented by a computer program instructing relevant hardware, and the program may be stored in a computer readable storage medium, when the program is running, the steps in the methods according to the embodiments described above are performed; and the storage medium may include various media capable of storing program codes, such as a read only memory (ROM), a random access memory (RAM), a magnetic disk, and an optical disk.

Finally, it should be noted that the above embodiments are merely provided for describing the technical solutions of the present invention, but not intended to limit the present invention. It should be understood by persons skilled in the art that although the present invention has been described in detail with reference to the foregoing embodiments, modifications still can be made to the technical solutions described in the foregoing embodiments, or equivalent replacements can be made to some technical features in the technical solutions; and such modifications or replacements do not cause the essence of corresponding technical solutions to depart from the spirit and scope of the technical solutions of each embodiment of the present invention.

What is claimed is:

1. A method for processing a heartbeat message, comprising:
   receiving, by a terminal, heartbeat control information from an access network device, wherein the heartbeat control information includes a heartbeat data amount threshold value;
   determining, by the terminal, a data amount of multiple heartbeat messages cached in an access layer of the terminal is greater than or equal to the heartbeat data amount threshold value, wherein the multiple heartbeat messages cached in the access layer of the terminal are acquired by the access layer of the terminal from an application layer of the terminal;
   bundling, by the terminal, the multiple heartbeat messages cached in an access layer of the terminal; and
   sending, by the terminal, in response to the determining, the bundled heartbeat messages to a server;
   wherein:
   the heartbeat control information is sent to the terminal by the access network device in response to the access network device determining that a load of the access network device is greater than a preset load threshold value; or
   the heartbeat control information is sent to the terminal by the access network device in response to the access network device acquiring an overload indication of a core network device.

2. A terminal, comprising a processor and a non-transitory processor-readable medium having processor-executable instructions stored thereon, wherein, the processor is configured, based on execution of the processor-executable instructions, to
   receive heartbeat control information from an access network device, wherein the heartbeat control information includes a heartbeat data amount threshold value;
   determine a data amount of multiple heartbeat messages cached in an access layer of the terminal is greater than or equal to the heartbeat data amount threshold value, wherein the multiple heartbeat messages cached in the access layer of the terminal are acquired by the access layer of the terminal from an application layer of the terminal;
   bundle the multiple heartbeat messages cached in an access layer of the terminal; and
   send the bundled heartbeat messages;
   wherein:
   the heartbeat control information is sent to the terminal by the access network device in response to the access network device determining that a load of the access network device is greater than a preset load threshold value; or
   the heartbeat control information is sent to the terminal by the access network device in response to the access network device acquiring an overload indication of a core network device.

3. The method according to claim 1, wherein the heartbeat data amount threshold value is greater than a data amount of one heartbeat message.

4. The method according to claim 1, wherein the heartbeat data amount threshold value is an amount of messages or a size of messages.

5. The terminal according to claim 2, wherein the heartbeat data amount threshold value is greater than a data amount of one heartbeat message.

6. The terminal according to claim 2, wherein the heartbeat data amount threshold value is a amount of messages or a size of messages.

* * * * *